(12) United States Patent
Arnett et al.

(10) Patent No.: US 7,841,841 B2
(45) Date of Patent: Nov. 30, 2010

(54) FLOW PRIORITIZING VALVE SYSTEM

(75) Inventors: Eric M. Arnett, Granger, IN (US); Paul W. Futa, Jr., North Liberty, IN (US)

(73) Assignee: Honeywell International Inc., Morristown, NJ (US)

( * ) Notice: Subject to any disclaimer, the term of this patent is extended or adjusted under 35 U.S.C. 154(b) by 504 days.

(21) Appl. No.: 11/844,199

(22) Filed: Aug. 23, 2007

(65) Prior Publication Data

US 2009/0053077 A1 Feb. 26, 2009

(51) Int. Cl.
*F04B 49/00* (2006.01)

(52) U.S. Cl. .................. 417/304; 417/296; 417/300; 417/308

(58) Field of Classification Search .............. 417/296, 417/300, 302, 304, 308; 60/734, 39.281
See application file for complete search history.

(56) References Cited

U.S. PATENT DOCUMENTS

| | | | | |
|---|---|---|---|---|
| 2,815,714 A | * | 12/1957 | Jacobson | 417/282 |
| 2,963,082 A | * | 12/1960 | Binford et al. | 239/533.2 |
| 6,195,978 B1 | * | 3/2001 | Futa, Jr. | 60/39.094 |
| 2002/0078678 A1 | * | 6/2002 | Maillard et al. | 60/39.281 |

* cited by examiner

*Primary Examiner*—Devon C Kramer
*Assistant Examiner*—Todd D Jacobs
(74) *Attorney, Agent, or Firm*—Ingrassia Fisher & Lorenz, P.C.

(57) ABSTRACT

A flow prioritizing system includes a regulating valve and a flow prioritizing valve. The regulating valve receives a first portion of the fluid supplied from a fuel supply pump, and is responsive to a control pressure to selectively allow or prohibit flow to secondary loads. The flow prioritizing control valve is responsive to fluid pressure representative of delivery pump discharge pressure to control the control pressure to which the regulating valve is responsive.

20 Claims, 5 Drawing Sheets

FLOW PRIORITIZING VALVE SYSTEM

TECHNICAL FIELD

The present invention generally relates to flow control valve systems and, more particularly, to a flow control valve system that prioritizes flow to various fluid loads.

BACKGROUND

Typical gas turbine engine fuel supply systems include a fuel source, such as a fuel tank, and one or more pumps that draw fuel from the fuel tank and deliver pressurized fuel to one or more primary fuel loads and to one or more secondary fuel loads via one or more supply lines. Generally, the primary fuel loads, which include the fuel manifolds in the engine combustor, are supplied with fuel via, for example, a priority flow line, and the secondary fuel loads, which may include a motive flow valve and regulator, one or more variable geometry actuators, and one or more bleed valves, are supplied with fuel via, for example, a secondary flow line.

During some operational conditions, the total fuel demand of the primary and secondary loads may be at or near the delivery capacity of the one or more pumps that deliver fuel to the loads. This can result in decreased fuel flow to both the primary and secondary loads. In the case where the primary fuel load is a gas turbine engine combustor, this reduced fuel flow can lead to undesirable effects, such as engine flame out or inability to start the engine. Thus, many fuel delivery systems are configured to either inhibit or prohibit fuel flow to secondary fuel loads when fuel demand is at, or approaching, pump delivery capacity. For example, many fuel delivery systems include one or more function-specific valves that are configured to prohibit fuel flow to the secondary fuel loads when fuel demand is at, or approaching, pump delivery capacity.

Although the above-described configuration is generally safe and reliable for prohibiting fuel flow to secondary fuel loads when needed, it does suffer certain drawbacks. For example, it is typically used only during an engine start sequence, and may not be active during other operational configurations of the engine. Additionally, because it uses function-specific valves, it can result in increased system weight, cost, and pressure drop, and can further result in decreased overall system reliability. Hence, there is a need for a system that prioritizes flow to a plurality of loads, such as primary and secondary fuel loads, and that provides a relative decrease in overall system weight, cost, and pressure drop, and/or can increase overall system reliability. The present invention addresses one or more of these needs.

BRIEF SUMMARY

In one embodiment, and by way of example only, a flow prioritizing system includes a pump, a regulating valve, and a flow prioritizing valve. The pump is configured to be driven at a drive speed and is operable, upon being driven, to supply fluid at a pump discharge pressure. The regulating valve is in fluid communication with the pump to receive a first portion of the fluid supplied therefrom. The regulating valve includes a control pressure inlet port and is responsive to priority control fluid pressure at the control pressure inlet port to move between a closed position, in which the first portion of the fluid does not flow through the regulating valve, and a plurality of open positions, in which the first portion of the fluid does flow through the regulating valve. The flow prioritizing control valve includes a pump capacity control pressure inlet port, and a prioritizing control pressure outlet port. The pump capacity control pressure inlet port is adapted to receive fluid at a pressure representative of the pump discharge pressure. The prioritizing control pressure outlet port is in fluid communication with the regulating valve control pressure inlet port. The flow prioritizing control valve is responsive to the pressure at the pump capacity fluid pressure inlet port to selectively supply fluid to the regulating valve control pressure inlet port at a control fluid pressure that moves the regulating valve at least toward the closed position.

Other exemplary embodiments are varied for the use of specific types of pumps. For example, the use of a positive displacement pump, a centrifugal pump, and a variable displacement piston pump.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although an embodiment of the invention is described as being implemented in a fuel flow control system, it will be appreciated that the invention may be implemented in numerous and varied end-use environments where flow prioritization is needed or desired.

Figure 1:
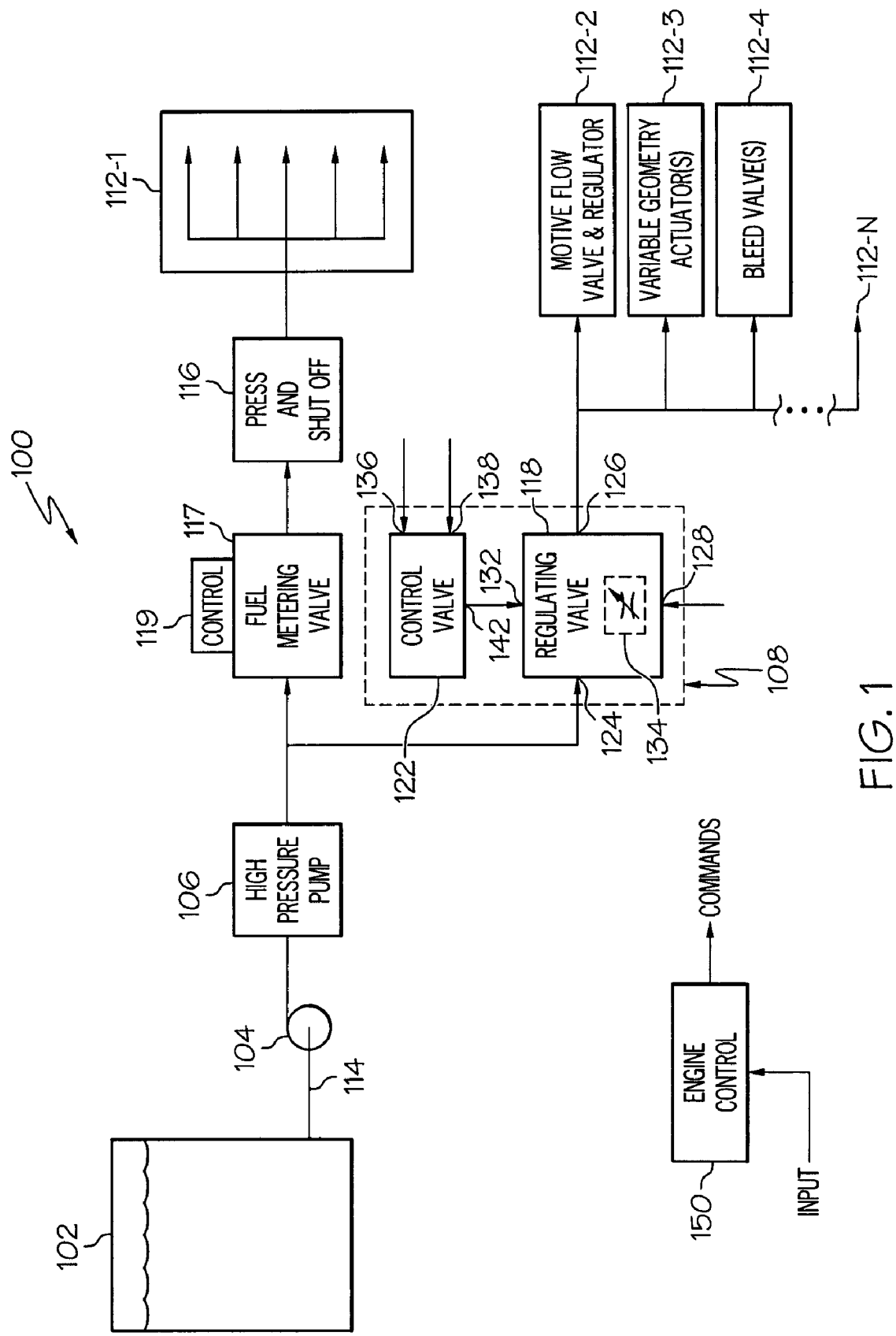
FIG. 1 is a simplified schematic diagram of an exemplary embodiment of a fuel delivery and control system for a gas turbine engine.

Turning now to FIG. 1, a simplified schematic diagram of one embodiment of a fuel delivery and control system for a gas turbine engine, such as a turbofan jet aircraft engine, is depicted. The system 100 includes a fuel source 102, one or more pumps 104, 106, a flow prioritizing valve system 108, and an engine control 150. The fuel source 102, which is preferably implemented as one or more tanks, stores fuel that is to be supplied to a plurality of fuel loads 112 (e.g. 112-1, 112-2, 112-3, . . . 112-N). It will be appreciated that the number and type of fuel loads may vary, and may include one or more of a gas turbine engine combustor zone and associated nozzles 112-1, a motive flow valve and regulator 112-2, one or more variable geometry actuators 112-3, and one or more bleed valves 112-4, just to name a few. The fuel loads 112 are preferably classified as primary and secondary fuel loads based, for example, on functionality. Though the classifications may vary, the gas turbine engine combustor zone and associated nozzles 112-1 are typically classified as primary fuel loads, and the motive flow valve and regulator 112-2, the one or more variable geometry actuators 112-3, and the one or more bleed valves 112-4 are typically classified as secondary fuel loads.

A supply line 114 is coupled to the fuel source 102 and, via the just-mentioned pumps 104, 106, delivers the fuel to the fuel loads 112. It is noted that the supply line 114 is, for convenience, depicted and described as a priority flow line 114-1 and a secondary flow line 114-2. The priority flow line 114-1 preferably delivers fuel to the primary fuel loads (e.g., the gas turbine engine combustor zone and associated nozzles 112-1), and the secondary flow line 114-2 preferably delivers fuel to the secondary fuel loads (e.g., 112-2, 112-3, 112-4, . . . 112-N). It will be appreciated that the system 100 could be alternatively configured. Preferably, a pressurizing-and-shutoff valve 116 is disposed in the primary flow line 114-1 upstream of the primary fuel loads 112-1. The pressurizing-and-shutoff valve 116 functions to ensure there is a minimum system pressure magnitude in the primary flow line 114-1, and shuts when the pressure falls below this minimum pressure magnitude. As will be described in more detail further below, the system 100 may additionally include a fuel metering valve 117 and associated control device 119. The fuel metering valve 117, if included, is disposed in the priority flow line 114-1 and is controlled to regulate fuel flow to the primary fuel loads 112-1.

Each of the one or more pumps 104, 106 is positioned in flow-series in the supply line 114 and take a suction on the fuel source 102. In the depicted embodiment, two engine-driven pumps are used and include a boost pump 104, such as a relatively low horsepower centrifugal pump, and a high pressure pump 106, such as a positive displacement pump, a centrifugal pump, or a variable displacement piston pump. The boost pump 104 takes a suction directly on the fuel source 102 and provides sufficient suction head for the high pressure pump 106. The high pressure pump 106 then supplies the fuel at a relatively high pressure to the remainder of the supply line 114. Although not depicted, it will be appreciated that the system 100 may additionally include a low pressure pump with the fuel tank(s) 102 to supply fuel to the boost pump 104.

The flow prioritizing valve system 108 is positioned downstream of the high pressure pump 106. The flow prioritizing valve system 108 regulates pressure in the secondary flow line 114-2 and selectively limits or shuts off fuel flow to the secondary flow line 114-2. More specifically, the flow prioritizing valve system 108 determines, based in part on one or more system pressures, if the total system fuel demand is at or exceeding the capacity of the high pressure pump 106. As the high pressure pump 106 begins approaching its operational flow capacity, the flow prioritizing valve system 108 begins reducing flow to the secondary flow line 114-2, and thus the secondary fuel loads 112-2, 112-3, 112-4, . . . 112-N. If the high pressure pump flow capacity is reached, the flow prioritizing valve system 108 preferably shuts off flow to the secondary flow line 114-2. As such, flow to the primary flow line 114-1, and thus the primary fuel loads 112-1, can be maintained at the desired level.

The flow prioritizing valve system 108 may be variously configured to implement the above-described functionality depending, at least in part, on the type of pump that is used to implement the high pressure pump 106. Generally, and as FIG. 1 depicts, the flow prioritizing valve system 108 includes a regulating valve 118 and a flow prioritizing control valve 122. The regulating valve 118 is disposed in the secondary flow line 114-2 and is in fluid communication with the high pressure pump 106, and thus receives a portion of the fuel supplied from the high pressure pump 106. The regulating valve 118 includes a secondary flow inlet port 124, a secondary flow outlet port 126, a reference pressure port 128, a control pressure inlet port 132, and a valve element 134 disposed between the secondary flow inlet 124 and the outlet 126 ports. The regulating valve 118 is responsive to fluid pressure at the control pressure inlet port 132, referred to herein as priority control fluid pressure, to move the valve element 134 between a closed position and a plurality of open positions. It will be appreciated that if the regulating valve 118 includes the reference pressure port 128, it is responsive to fluid pressure differential between the control pressure inlet port 132 and the reference pressure port 128. In the closed position, fuel does not does not flow through the regulating valve 118. In any of the plurality of open positions, fuel flows through the regulating valve 118 and is supplied at a pressure based on the position of the valve element 134.

The flow prioritizing control valve 122 includes a pump capacity control pressure inlet port 136, a reference pressure port 138, and a prioritizing control pressure outlet port 142. The prioritizing control pressure outlet port 142 is in fluid communication with the regulating valve control pressure inlet port 132. It will be appreciated that the fuel that is supplied to the pump capacity control pressure inlet port 136 may be supplied directly or indirectly from the priority flow line 114-1 downstream of the high pressure pump 106, or from another source that is representative of high pressure pump discharge pressure. As will be described in more detail further below, the specific source may vary depending on, for example, the type of pump that is used to implement the high pressure pump 106. No matter the specific source of the fuel that is supplied to the pump capacity control pressure inlet port 136, the flow prioritizing control valve 122 is responsive to the pressure at the pump capacity control pressure inlet port 136 to selectively supply fuel to the regulating valve control pressure inlet port 132 at a pressure that moves the regulating valve at least toward the closed position. More detailed descriptions of various configurations of the flow prioritizing valve system 108, and the operations of each configuration, will be provided further below. Before doing so, however, a description of the remainder of the depicted fuel supply system will, for completeness, be provided.

Although not depicted in FIG. 1, it will be appreciated that the system 100, in some embodiments may additionally include a bypass flow line. The bypass flow line, if included, is preferably connected to the priority flow line 114-1 between the high pressure pump 106 and the fuel metering valve 117, and bypasses a portion of the fuel in the supply line 114 back to the inlet of the high pressure pump 106, the inlet of the booster pump 104, or back to the fuel source 102. To do so, the bypass line may include a bypass valve that is positioned to selectively bypass fuel flow in the priority flow line 114-1 away from the metering valve 117. The fuel metering valve 117 and the non-illustrated bypass flow line are both preferably controlled in response to commands supplied from the engine control 150, which, for completeness, will now be briefly described.

The engine control 150, which may be, for example, a Full Authority Digital Engine Controller (FADEC), controls the overall operation of the gas turbine engine (or engines), including the flow of fuel from the fuel source 102 to the fuel loads 112. The engine control 150 preferably receives various input signals and supplies commands to the pumps 104, 106 and/or the fuel metering valve 117 and non-illustrated bypass valve, to thereby control the fuel flow rate to the combustor nozzles 112-1.

It was noted above that the flow prioritizing valve system 108 may be variously configured, and that the specific configuration depends, at least in part, on the type of pump that is used to implement the high pressure pump 106. For example, the configuration of the flow prioritizing valve system 108 will vary depending on whether the high pressure pump 106 is implemented using a positive displacement pump, a centrifugal pump, or a variable displacement piston pump. The preferred flow prioritizing valve system configurations for fuel supply and control systems 100 (or other types of fluid supply systems) implemented using each of these types of high pressure pumps 106 will now be described in more detail. Before doing so, however, it is noted that like reference numerals in FIG. 1 and the proceeding drawings refer to like system, sub-systems, and components.

Figure 2:
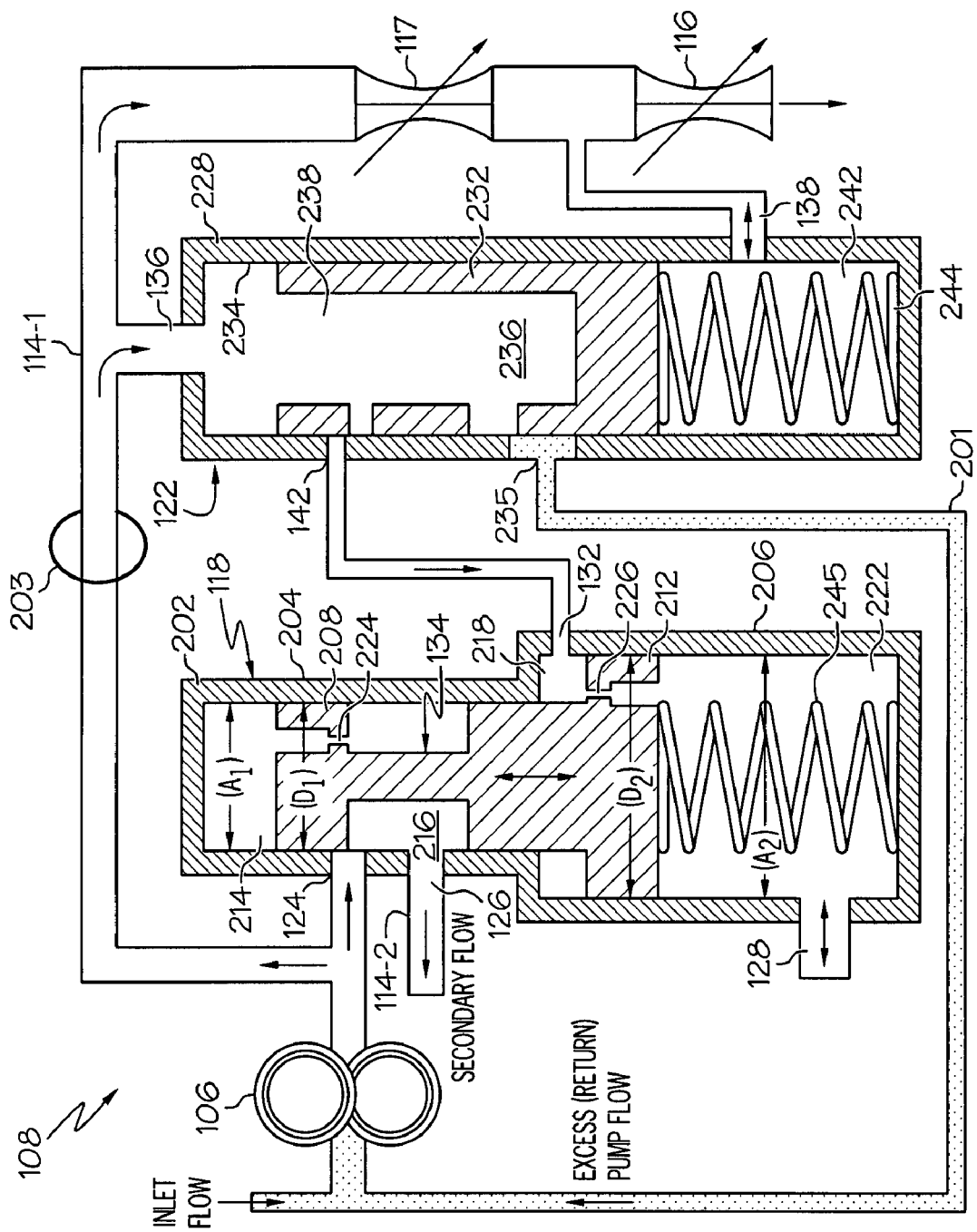
FIG. 2 is a functional block diagram of an exemplary flow prioritizing valve system that may be used to implement the fuel delivery and control system of FIG. 1.

Turning first to FIG. 2, a preferred flow prioritizing valve system 108 for a fuel supply and control system 100 in which the high pressure pump 106 is implemented as a positive displacement pump will be described. It is noted that this system 100, only a portion of which is depicted in FIG. 2, includes the above-mentioned fuel metering valve 117 and the above-mentioned bypass flow line 201, and may additionally include a minimum pressure valve 203 if needed or desired. It is further noted that with this particular configuration, the flow prioritizing control valve 122 also functions as the previously mentioned, and non-illustrated, bypass valve. The depicted flow prioritizing valve system 108 includes the previously described regulating valve 118 and flow prioritizing control valve 122, and each valve 118, 122 includes at least each of the previously described ports. In the depicted embodiment, the regulating valve's valve element 134 is disposed within a valve body 202 that includes the secondary flow inlet port 124, the secondary flow outlet port 126, the reference pressure port 128, and the control pressure inlet port 132. The valve body 202 is configured to include a first section 204 and a second section 206. The first section 204 has a first cross sectional area ($A_1$) and the second section 206 has a second cross sectional area ($A_2$) that is greater than the first cross sectional area. The specific values and ratios of the first and second cross sectional areas may vary to meet design and functional specifications. The secondary flow inlet port 124 and the secondary flow outlet port 126 are each formed in the valve body first section 204, whereas the reference pressure port 128 and the control pressure inlet port 132 are each formed in the valve body second section 206. The reference pressure port 128, at least in the depicted embodiment, is coupled to a non-illustrated reference pressure source that supplies at least a substantially constant fluid pressure to the reference pressure port 128.

The depicted valve element 134 includes a first spool 208 and a second spool 212. The first spool 208 is disposed within the valve body first section 204 and has a first diameter ($D_1$), and the second spool 212 is disposed within the valve body second section 206 and has a second diameter ($D_2$) that is greater than the first diameter ($D_1$). The first spool 208 is coupled to the second spool 212 and, as FIG. 2 further shows, the valve element 134 is configured such that the first and second spools 208, 212 are fluidly isolated from each other. The first spool 208 additionally divides the valve body first section 204 into first and second chambers 214, 216, and the second spool 212 divides the valve body second section 206 into third and fourth chambers 218, 222. The regulating valve 118 is configured such that the first chamber 214 is continuously in fluid communication with the secondary flow outlet port and, as will be described in more detail further below, is selectively in fluid communication with the secondary flow inlet port 124, via a flow restrictor 224 that extends through the first spool 208. Moreover, the third chamber 218 is in fluid communication with the control pressure inlet port 132, the fourth fluid chamber 222 is in fluid communication with the reference pressure port 128, and the third and fourth chambers 218, 222 are in fluid communication with each other via another flow restrictor 226 that extend through the second spool 212.

The depicted flow prioritizing control valve 122 includes a valve body 228 and a valve element 232. The valve body 228 includes an inner surface 234 that defines a main chamber 236, and includes the pump capacity control pressure inlet port 136, the reference pressure port 138, the prioritizing control pressure outlet port 142, and a bypass flow discharge port 235. The pump capacity control pressure inlet port 136 is in fluid communication with the priority flow line 114-1 downstream of the high pressure pump 106, and thus receives a portion of the fuel that is discharged from the high pressure pump 106. The reference pressure port 138 is in fluid communication with the priority flow line 114-1 downstream of the fuel metering valve 117, and the bypass flow discharge port 235 is in fluid communication with the bypass flow line 201.

The valve element 232 is movably disposed in the valve body main chamber 236 and divides the main chamber 236 into a first sub-chamber 238 and a second sub-chamber 242. The first sub-chamber 238 is continuously in fluid communication with the pump capacity control pressure inlet port 136. Moreover, depending on the position of the valve element 232, the first sub-chamber 238 is selectively placed in fluid communication with the prioritizing control pressure outlet port 142 and the bypass flow discharge port 235. The second sub-chamber 242 is continuously in fluid communication with the reference pressure port 138.

More specifically, the valve element 232 is responsive, at least in part, to a difference in fluid pressure at the pump capacity control pressure inlet port 136 and the reference pressure port 138 to move to a plurality of positions. In a first subset of positions, such as the one depicted in FIG. 2, the valve element 232 is positioned such that the pump capacity control pressure inlet port 136, and thus the first sub-chamber 238, is in fluid communication with the bypass flow discharge port 235, and is not in fluid communication with the prioritizing control pressure outlet port 142. In a second subset of positions, the pump capacity control pressure inlet port 136, and thus the first sub-chamber 238, is in fluid communication with both the bypass flow discharge port 235 and the prioritizing control pressure outlet port 142. In a third subset of positions, the pump capacity control pressure inlet port 136, and thus the first sub-chamber 238, is only in fluid communication with the prioritizing control pressure outlet port 142. It is noted that the valve element 232 is additionally responsive, at least in the depicted embodiment, to a spring 244 that is disposed in the valve body second sub-chamber 242 between the valve body inner surface 234 and the valve element 232. The spring 244 is configured to urge the valve element 232 toward the second and third subsets of positions.

The flow prioritizing control valve 122 described above and depicted in FIG. 2 is configured such that the valve element 232 is in one of the first subset of positions when the discharge pressure of the high pressure pump 106, or more specifically the fluid pressure in the priority flow line 114-1 downstream of the high pressure pump 106, is above a first discharge pressure, and is in one of the second or third subsets of positions when the discharge pressure is below the first discharge pressure. During normal system operations, the high pressure pump 106 is operated below its capacity, and thus its discharge pressure is above the first discharge pressure. It will thus be appreciated that during normal system operations the flow prioritizing control valve 122 is in one of the first subset of positions. As such, the pump capacity control pressure inlet port 136 is in fluid communication only with the bypass flow discharge port 235, and a portion of the fuel in the priority flow line 114-1 is bypassed back to the inlet of the high pressure pump 106. Because the prioritizing control pressure outlet port 142 is not in fluid communication with the pump capacity control pressure inlet port 136, fluid pressure at the prioritizing control pressure outlet port 142, and thus at the regulating valve control pressure inlet port 132, will be equalized to the fluid pressure in the fourth fluid chamber 222 via the flow restrictor 226 in the regulating valve second spool 212. As such, the regulating valve 118 is in an open position, and fuel is supplied to secondary flow line 114-2 and thus the secondary fuel loads 112-2, 112-3, 112-4, . . . , 112-N at a regulated pressure. It is additionally noted that when the high pressure pump 106 is operated below its capacity, the flow prioritizing control valve 122 is configured to maintain a substantially constant differential pressure across the metering valve 117.

If the demand on the high pressure pump 106 increases and the high pressure pump approaches its capacity for the particular pump speed, the pressure in the priority flow line 114-1 will begin decreasing. As a result, the flow prioritizing control valve 122 will begin moving toward the second subset of positions. When the flow prioritizing control valve 122 moves to one of the second subset of positions, the prioritizing control valve pump capacity control pressure inlet port 136 is placed in fluid communication with the prioritizing control pressure outlet port 142, and remains, at least slightly, in fluid communication with the bypass flow discharge port 235. As a result, fuel in the priority flow line 114-1 will begin flowing through the prioritizing control pressure outlet port 142 to the regulating valve control pressure inlet port 132. Due to the presence of the flow restrictor 226 in the regulating valve second spool 212, fluid pressure in the regulating valve third chamber 218 will begin controllably increasing. The increased fluid pressure in the third chamber 218 will urge the regulating valve's valve element 134 toward the closed position, against the force of a bias spring 245 in the fourth chamber 222, thereby decreasing fluid pressure in the secondary flow line 114-2 and thus flow to the secondary fuel loads 112-2, 112-3, 112-4, . . . , 112-N. Preferably, the regulating valve 118 and the flow prioritizing control valve 122 are sized such that the regulating valve 118 closes in a controlled, stable manner, and is completely closed prior to the flow prioritizing control valve 122 moving to one of the third subset of positions.

Before proceeding further it is noted that in the just-described embodiment, and in each of the proceeding embodiments, the flow prioritizing valve system 108 will operate as described so long as the discharge pressure of the high pressure pump 106 is greater than the fluid pressure of the non-illustrated reference pressure source supplied to reference pressure port 128. It is additionally noted that if the system 100 is configured such that the discharge pressure of the high pressure pump 106 is always greater than the regulated pressure of the secondary flow line 114-2, then the control flow may be routed directly to the first chamber 214.

Figure 3:
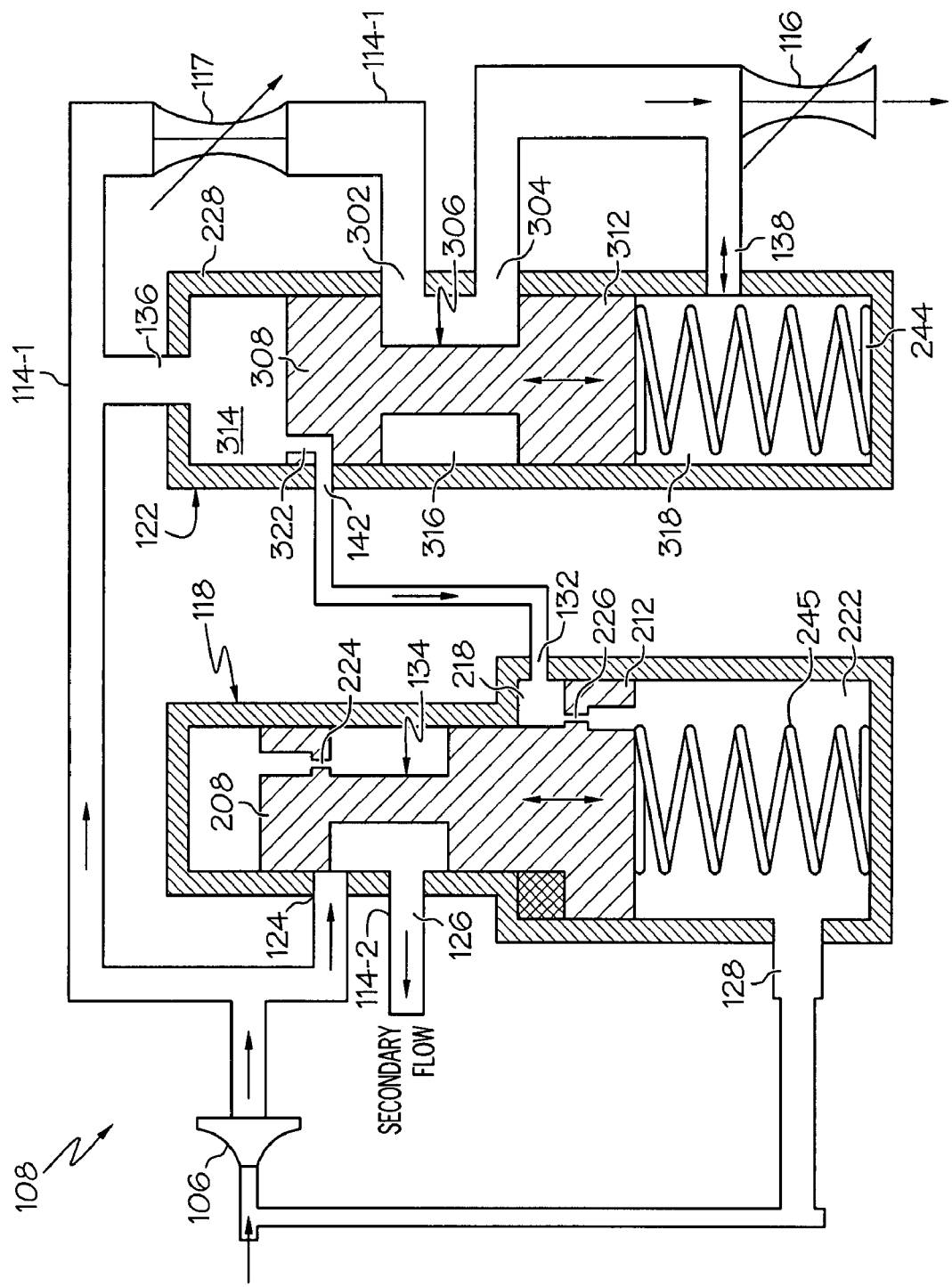
FIG. 3 a functional block diagram of another exemplary flow prioritizing valve system that may be used to implement the fuel delivery and control system of FIG. 1.

Turning now to FIG. 3, a preferred flow prioritizing valve system 108 for a fuel supply and control system 100 in which the high pressure pump 106 is implemented as a centrifugal pump will be described. It is noted that the regulating valve 118 is configured substantially identical to the regulating valve 118 depicted in FIG. 2 and described above, and thus for brevity will not again be described in detail. One minor difference is that the regulating valve reference pressure port 128, at least in the depicted embodiment, is coupled to the inlet to the centrifugal pump 106. It is further noted that this system 100, only a portion of which is depicted in FIG. 3, includes the above-mentioned fuel metering valve 117 but does not include the above-mentioned bypass flow line 201. Indeed, rather than being implemented to function as a bypass valve and to bypass a portion of the fuel in the priority flow line 114-1 is back to the inlet of the high pressure pump 106, the flow prioritizing control valve 122, an embodiment of which will now be described, is preferably implemented to function as a throttle valve.

The flow prioritizing control valve 122 in FIG. 3 includes the pump capacity control pressure inlet port 136, the reference pressure port 138, and the prioritizing control pressure outlet port 142, but does not include the bypass flow discharge port 235. However, the valve body 228 additionally includes a priority flow inlet port 302 and a priority flow outlet port 304. The priority flow inlet and outlet ports 302, 304 are each in fluid communication with the priority flow line 114-1 downstream of the metering valve 117. As will become apparent from the subsequent discussion, the flow prioritizing control valve 122 is further responsive to fluid pressure at the pump capacity control pressure inlet port 136 to throttle flow downstream of the metering valve 117 to the primary fuel loads 112-1.

To implement the above-described functionality, the flow prioritizing control valve's valve element 306 includes a first spool 308 and a second spool 312. The first and second spools 308, 312 are coupled together and spaced apart from each other, and divide the valve body main chamber 236 into three sub-chambers—namely, a first sub-chamber 314, a second sub-chamber 316, and a third sub-chamber 318. The flow prioritizing control valve 122 is configured such that the first sub-chamber 314 is continuously in fluid communication with the pump capacity control pressure inlet port 136 and, depending on the position of the valve element 306, is selectively placed in fluid communication with the prioritizing control pressure outlet port 142. Moreover, the second sub-chamber is continuously in fluid communication with the priority flow outlet port 304 and, depending on the position of the valve element 306, is at least selectively in fluid communication with the priority flow inlet port 302. The third sub-chamber 318 is continuously in fluid communication with the reference pressure port 138.

More specifically, the valve element 306 is responsive, at least in part, to a difference in fluid pressure at the pump capacity control pressure inlet port 136 and the reference pressure port 138 to move between one or more first positions and one or more second positions. In the one or more first positions, the pump capacity control pressure inlet port 136 is in fluid communication with the prioritizing control pressure outlet port 142 via, for example, a flow passage 322 that is formed in and extends through the first spool 308. In the one or more second positions, the pump capacity control pressure inlet port 136 is not in fluid communication with the prioritizing control pressure outlet port 142. It is additionally seen that when the valve element 306 is in the one or more first positions, the valve element first spool 308 covers less of the priority flow inlet port 302, thus throttling fuel flow to the primary fuel loads 112-1 relatively less. Conversely, when the valve element 306 is in the one or more second positions, the valve element first spool 308 covers relatively more of the priority flow inlet port 302, thus throttling fuel flow to the primary fuel loads 112-1 relatively more.

The flow prioritizing control valve 122 described above and depicted in FIG. 3 is configured such that the valve element 306 is in the one or more first positions when the discharge pressure of the high pressure pump 106, or more specifically the fluid pressure in the priority flow line 114-1 downstream of the high pressure pump 106, is at or below a first discharge pressure, and is in the one or more second positions when the discharge pressure is above the first discharge pressure. During normal system operations, the high pressure pump 106 is operated below its capacity, and thus its discharge pressure is above the first discharge pressure. It will thus be appreciated that during normal system operations the flow prioritizing control valve 122 is in the one or more second positions, throttling flow to the primary fuel loads 112-1 downstream of the metering valve 117. As such, the pump capacity control pressure inlet port 136 is not in fluid communication with the prioritizing control pressure outlet port 142. Fluid pressure at the prioritizing control pressure outlet port 142, and thus at the regulating valve control pressure inlet port 132, will therefore be equalized to the fluid pressure in the regulating valve fourth fluid chamber 222 via the flow restrictor 226 in the regulating valve second spool 212. As a result, the regulating valve 118 is in an open position, and fuel is supplied to secondary flow line 114-2 and, thus the secondary fuel loads 112-2, 112-3, 112-4, . . . , 112-N, at a regulated pressure.

If the demand on the high pressure pump 106 increases and the high pressure pump 106 approaches its capacity for the particular pump speed, the pressure in the priority flow line 114-1 will begin decreasing. As a result, the flow prioritizing control valve 122 will begin moving toward the one or more first positions, and throttling flow relatively less to the primary fuel loads 112-1. When the flow prioritizing control valve 122 moves to the one or more first positions, the prioritizing control valve pump capacity control pressure inlet port 136 is placed in fluid communication with the prioritizing control pressure outlet port 142 via the flow passage 322 in the first spool 308. As a result, fuel in the priority flow line 114-1 will begin flowing through the prioritizing control pressure outlet port 142 to the regulating valve control pressure inlet port 132. Due to the presence of the flow restrictor 226 in the regulating valve second spool 212, fluid pressure in the regulating valve third chamber 218 will begin controllably increasing. The increased fluid pressure in the third chamber 218 will urge the regulating valve's valve element 134 toward the closed position, thereby decreasing fluid pressure in the secondary flow line 114-2 and thus flow to the secondary fuel loads 112-2, 112-3, 112-4, . . . , 112-N. As with the previously described embodiment, the regulating valve 118 and the flow prioritizing control valve 122 are sized such that the regulating valve 118 closes in a controlled, stable manner.

Figure 4:
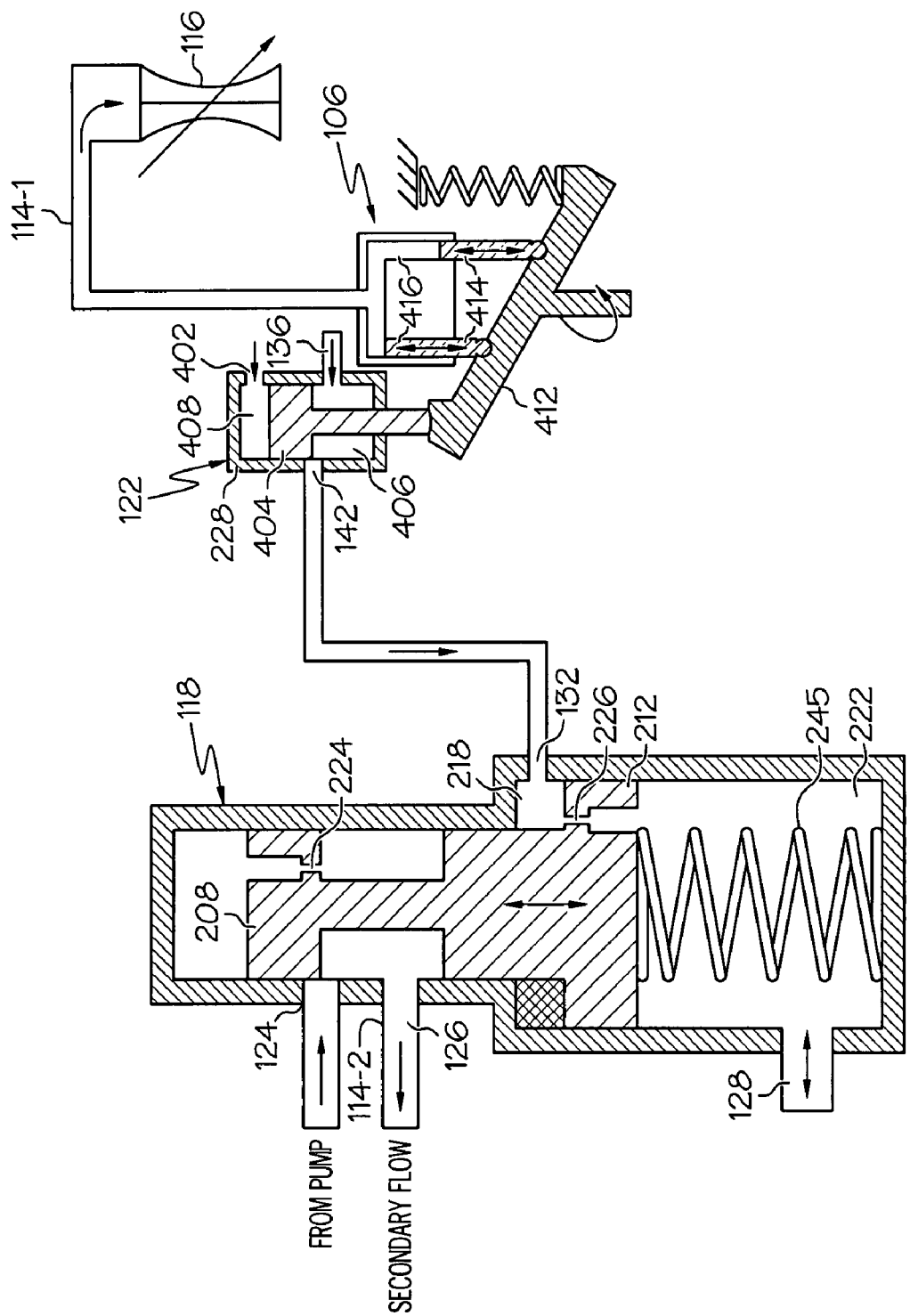
FIG. 4 is a functional block diagram of yet another exemplary flow prioritizing valve system that may be used to implement the fuel delivery and control system of FIG. 1.

Referring now to FIG. 4, a preferred flow prioritizing valve system 108 for a fuel supply and control system 100 in which the high pressure pump 106 is implemented as a variable displacement piston pump will be described. It is once again noted that the regulating valve 118 is configured substantially identical to the regulating valve 118 depicted in FIG. 2 and described above, and will thus not be once again described in detail. It is further noted that this system 100, which is again only partially depicted in FIG. 4, does not include the above-mentioned fuel metering valve 117 nor the above-mentioned bypass flow line 201. Indeed, rather than being implemented to function as a bypass valve or a throttle valve, the flow prioritizing control valve 122, an embodiment of which will now be described, is preferably implemented as a pump control actuator to control, at least in part, the high pressure pump 106. It will be appreciated, however, that the depicted system could be implemented with the fuel metering valve 117, if needed or desired.

The flow prioritizing control valve 122 in FIG. 4 includes the pump capacity control pressure inlet port 136 and the prioritizing control pressure outlet port 142, but does not include the reference pressure port 138, the bypass flow discharge port 235, or the priority flow inlet and outlet ports 302, 304. However, the valve body 228 additionally includes a pump control pressure port 402. The pump capacity control pressure inlet port 136 is in fluid communication with a first, non-illustrated control pressure source, and the pump control pressure port 402 is in fluid communication with a second, non-illustrated control pressure source. As will become apparent from the subsequent discussion, the flow prioritizing control valve 122 is responsive to differential fluid pressure at the pump capacity control pressure inlet port 136 and the pump control pressure port 402 to control the discharge pressure, and thus the supply flow rate, of the high pressure pump 106.

To implement the above-described functionality, the flow prioritizing control valve's valve element 404 is disposed in the valve body 228, and divides the valve body main chamber 236 into two sub-chambers—a first sub-chamber 406 and a second sub-chamber 408. The flow prioritizing control valve 122 is configured such that the first sub-chamber 406 is continuously in fluid communication with the pump capacity control pressure inlet port 136, and thus the first control pressure source. Moreover, depending on the position of the valve element 404, the pump capacity control pressure inlet port 136 is selectively placed in fluid communication with the prioritizing control pressure outlet port 142. The second sub-chamber 408 is continuously in fluid communication with the pump control pressure port 402. As FIG. 4 further depicts, the valve element 404 is coupled to, or contacts, a swash plate 412 in the high pressure pump 106. For completeness, a brief description of the configuration of the high pressure pump in this embodiment will be provided.

The high pressure pump 106, as noted above, is implemented in the depicted embodiment as a variable displacement piston pump. As is generally known, a variable displacement piston pump can be adjusted to increase or decrease the amount of fuel it supplies. More specifically, the swash plate 412, or hanger as it is sometimes referred to, is coupled to a plurality of pistons 414 that are disposed, one each, in a plurality of cylinders 416. The stroke of the pistons 414 in the cylinders 416, and thus the flow rate of the variable displacement piston pump 106, is varied by varying the position of the swash plate 412. The position of the swash plate 412 is varied by the flow prioritizing control valve 122.

Returning now to a description of the flow prioritizing control valve 122, it may be seen that the valve element 404 is responsive, at least in part, to a difference in fluid pressure at the pump capacity control pressure inlet port 136 and the pump control pressure port 402 to move between one or more first positions and one or more second positions. In the one or more first positions, the pump capacity control pressure inlet port 136 is in fluid communication with the prioritizing control pressure outlet port 142. In the one or more second positions, the pump capacity control pressure inlet port 136 is not in fluid communication with the prioritizing control pressure outlet port 142. It is additionally seen that when the valve element 404 is in the one or more first positions, the angle of the swash plate 412 is in a position that commands a relatively higher fuel flow, for a given pump drive speed, from the high pressure pump 106 to the primary fuel loads 112-1. Conversely, when the valve element 404 is in the one or more second positions, the angle of the swash plate 412 is in a position that commands a relatively lower fuel flow, for a given pump drive speed, from the high pressure pump 106 to the primary fuel loads 112-1.

The flow prioritizing control valve 122 described above and depicted in FIG. 4 is configured such that the valve element 404 is in the one or more first positions when the discharge pressure of the high pressure pump 106, or more specifically the fluid pressure in the priority flow line 114-1 downstream of the high pressure pump 106, is at or below a first discharge pressure, and is in the one or more second positions when the discharge pressure is above the first discharge pressure. During normal system operations, the high pressure pump 106 is operated below its capacity, and thus its discharge pressure is above the first discharge pressure. It will thus be appreciated that during normal system operations the flow prioritizing control valve 122 is in the one or more second positions, and the pump capacity control pressure inlet port 136 is not in fluid communication with the prioritizing control pressure outlet port 142. Therefore, fluid pressure at the prioritizing control pressure outlet port 142, and thus at the regulating valve control pressure inlet port 132, will be equalized to the fluid pressure in the regulating valve fourth fluid chamber 222 via the flow restrictor 226 in the regulating valve second spool 212. As a result, the regulating valve 118 is in an open position, and fuel is supplied to secondary flow line 114-2, and thus the secondary fuel loads 112-2, 112-3, 112-4, . . . , 112-N, at a regulated pressure.

If the demand on the high pressure pump 106 increases and the high pressure pump 106 approaches its capacity for the particular pump speed, the pressure in the priority flow line 114-1 will begin decreasing. As a result, the differential fluid pressure at the pump capacity control pressure inlet port 136 and the pump control pressure port 402 will vary in a manner that causes the flow prioritizing control valve 122 to begin moving toward the one or more first positions, and increasing fuel flow from the high pressure pump 106. When the flow prioritizing control valve 122 moves to the one or more first positions, the pump capacity control pressure inlet port 136 is placed in fluid communication with the prioritizing control pressure outlet port 142. As a result, fuel will begin flowing through the prioritizing control pressure outlet port 142 to the regulating valve control pressure inlet port 132. Due to the presence of the flow restrictor 226 in the regulating valve second spool 212, fluid pressure in the regulating valve third chamber 218 will begin controllably increasing. The increased fluid pressure in the third chamber 218 will urge the regulating valve's valve element 134 toward the closed position, thereby decreasing fluid pressure in the secondary flow line 114-2 and thus flow to the secondary fuel loads 112-2, 112-3, 112-4, . . . , 112-N. As with the previously described embodiments, the regulating valve 118 and the flow prioritizing control valve 122 are sized such that the regulating valve 118 closes in a controlled, stable manner.

Figure 5:
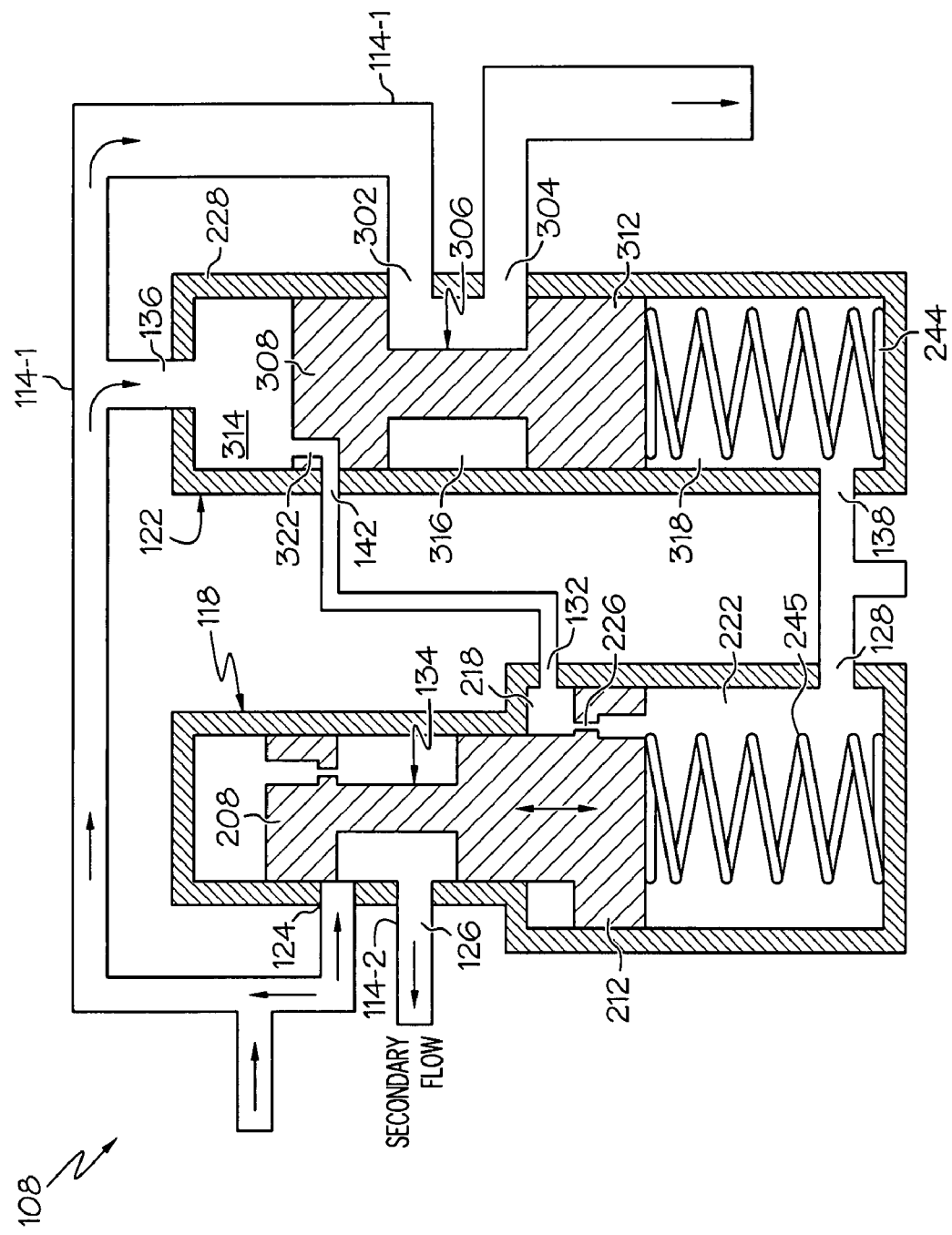
FIG. 5 is a functional block diagram of an exemplary flow prioritizing valve system that may be used to implement the fuel delivery and control system of FIG. 1, regardless of the type of pump that is used.

With reference now to FIG. 5, a preferred flow prioritizing valve system 108 for a fuel supply and control system 100 is depicted. It is noted that this flow prioritizing valve system 108 may be used with any of the previously described high pressure pumps 106. This embodiment is configured, with a few minor exceptions, quite similar to that depicted in FIG. 3, and as such like reference numerals in FIGS. 3 and 5 refer to like parts, the descriptions of which will not be repeated. In this embodiment, the flow prioritizing valve system 108 differs from the embodiment of FIG. 5 in that the flow prioritizing control valve 122 is implemented as a pressure regulating valve, and the regulating valve reference pressure port 128 is not couple to the inlet of the high pressure pump 106. Rather, the regulating valve reference pressure port 128 and the flow prioritizing control valve reference pressure port 138 are both coupled to the same non-illustrated reference pressure source.

The flow prioritizing control valve 122 described above and depicted in FIG. 5 is configured such that the valve element 306 is in the one or more first positions when the discharge pressure of the high pressure pump 106, or more specifically the fluid pressure in the priority flow line 114-1 downstream of the high pressure pump 106, is at or below a first discharge pressure, and is in the one or more second positions when the discharge pressure is above the first discharge pressure. During normal system operations, the high pressure pump 106 is operated below its capacity, and thus its discharge pressure is above the first discharge pressure. It will thus be appreciated that during normal system operations the flow prioritizing control valve 122 is in the one or more second positions, regulating fuel pressure and flow to the primary fuel loads 112-1. As such, the pump capacity control pressure inlet port 136 is not in fluid communication with the prioritizing control pressure outlet port 142. Fluid pressure at the prioritizing control pressure outlet port 142, and thus at the regulating valve control pressure inlet port 132, will therefore be equalized to the fluid pressure in the regulating valve fourth fluid chamber 222 via the flow restrictor 226 in the regulating valve second spool 212. As a result, the regulating valve 118 is in an open position, and fuel is supplied to secondary flow line 114-2 and, thus the secondary fuel loads 112-2, 112-3, 112-4, . . . , 112-N, at a regulated pressure.

If the demand on the high pressure pump 106 increases and the high pressure pump 106 approaches its capacity for the particular pump speed, the pressure in the priority flow line 114-1 will begin decreasing. As a result, the flow prioritizing control valve 122 will begin moving toward the one or more first positions, and throttling flow relatively less to the primary fuel loads 112-1 to try and maintain the regulated pressure. When the flow prioritizing control valve 122 moves to the one or more first positions, the prioritizing control valve pump capacity control pressure inlet port 136 is placed in fluid communication with the prioritizing control pressure outlet port 142 via the flow passage 322 in the first spool 308. As a result, fuel in the priority flow line 114-1 will begin flowing through the prioritizing control pressure outlet port 142 to the regulating valve control pressure inlet port 132. Due to the presence of the flow restrictor 226 in the regulating valve second spool 212, fluid pressure in the regulating valve third chamber 218 will begin controllably increasing. The increased fluid pressure in the third chamber 218 will urge the regulating valve's valve element 134 toward the closed position, thereby decreasing fluid pressure in the secondary flow line 114-2 and thus flow to the secondary fuel loads 112-2, 112-3, 112-4, . . . , 112-N. As with the previously described embodiment, the regulating valve 118 and the flow prioritizing control valve 122 are sized such that the regulating valve 118 closes in a controlled, stable manner.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow prioritizing system, comprising:
   a pump configured to be driven at a drive speed and operable, upon being driven, to supply fluid at a pump discharge pressure;

a regulating valve in fluid communication with the pump to receive a first portion of the fluid supplied therefrom, the regulating valve including a valve body and a valve element, the valve body comprising a first section, a second section, a secondary flow inlet port, a secondary flow outlet port, a reference pressure port, and a control pressure inlet port, the first section having a first cross sectional area and having the secondary flow inlet port and the secondary flow outlet port formed therein, the second section having a second cross sectional area that is greater than the first cross sectional area and having the reference pressure port and the control pressure inlet port formed therein, the secondary flow inlet port in fluid communication with the pump to receive the first portion of the fluid supplied therefrom, the reference pressure port adapted to be coupled to a reference pressure source, the valve element disposed within the valve body and comprising a first spool and a second spool, the first spool coupled to, and fluidly isolated from, the second spool and having a first diameter, the second spool having a second diameter that is greater than the first diameter, the valve element second spool disposed in the second section and dividing the second section into first and second chambers, the first chamber in fluid communication with the control pressure inlet port, the second chamber in fluid communication with the reference pressure port, the valve element movable, in response to priority control fluid pressure at the control pressure inlet port to move between a closed position, in which the secondary flow inlet port is not in fluid communication with the secondary flow outlet port the first portion of the fluid does not flow through the regulating valve, and a plurality of open positions, in which the secondary flow inlet port is in fluid communication with the secondary flow outlet port the first portion of the fluid does flow through the regulating valve; and a flow prioritizing control valve including a pump capacity control pressure inlet port, and a prioritizing control pressure outlet port, the pump capacity control pressure inlet port adapted to receive fluid at a pressure representative of the pump discharge pressure, the prioritizing control pressure outlet port in fluid communication with the regulating valve control pressure inlet port, the flow prioritizing control valve responsive to the pressure at the pump capacity fluid pressure inlet port to selectively supply fluid to the regulating valve control pressure inlet port at a control fluid pressure that moves the regulating valve at least toward the closed position.

2. The system of claim 1, wherein:
the valve element first spool is disposed in the valve body first section and divides the valve body first section into third and fourth chambers, the third chamber continuously in fluid communication with the secondary flow outlet port and, depending on valve element first spool position, selectively in fluid communication with the secondary flow inlet port.

3. The system of claim 2, further comprising:
a first flow restrictor extending through the valve element first spool and fluidly communicating the third and fourth chambers; and
a second flow restrictor extending through the valve element second spool and fluidly communicating the first and second chambers.

4. The system of claim 1, wherein the flow prioritizing control valve comprises:
a flow prioritizing control valve body including the pump capacity control pressure inlet port, the prioritizing control pressure outlet port, a priority flow inlet port, a priority flow outlet port, and a flow prioritizing control valve reference pressure port, the flow prioritizing control valve reference pressure port in fluid communication with the regulating valve reference pressure port; and
a flow prioritizing control valve element disposed in the flow prioritizing control valve body and responsive, at least in part, to a difference in fluid pressure at the pump capacity control pressure inlet port and the flow prioritizing control valve reference pressure port to move between one or more first positions, in which the pump capacity control pressure inlet port is in fluid communication with the prioritizing control pressure outlet port, and one or more second positions in which the pump capacity control pressure inlet port is not in fluid communication with the prioritizing control pressure outlet port.

5. The system of claim 1, wherein:
the pump is a positive displacement pump;
the pump capacity control pressure inlet port is in fluid communication with the prioritizing control pressure outlet port when the flow prioritizing control valve is supplying fluid to the regulating valve control pressure inlet port;
the flow prioritizing control valve further includes a bypass flow discharge port; and
the flow prioritizing control valve is further responsive to the fluid pressure at the pump capacity control pressure inlet port to control fluid flow out the bypass flow discharge port.

6. The system of claim 5, wherein the flow prioritizing control valve comprises:
a flow prioritizing control valve body including the pump capacity control pressure inlet port, the prioritizing control pressure outlet port, the bypass flow discharge port, and a flow prioritizing control valve reference pressure port, the pump capacity control pressure inlet port in fluid communication with the pump to receive a second portion of the fluid supplied therefrom; and
a flow prioritizing control valve element disposed in the flow prioritizing control valve body and responsive, at least in part, to a difference in fluid pressure at the pump capacity control pressure inlet port and the flow prioritizing control valve reference pressure port to move between one or more first positions, in which the pump capacity control pressure inlet port is in fluid communication with the prioritizing control pressure outlet port, and one or more second positions in which the pump capacity control pressure inlet port is not in fluid communication with the prioritizing control pressure outlet port.

7. The system of claim 6, wherein:
the flow prioritizing control valve element is in the one or more first positions when the pump discharge pressure is at or below a first pressure;
the flow prioritizing control valve element is in the one or more second positions when the pump discharge pressure is above the first discharge pressure; and
the pump capacity control pressure inlet port is in fluid communication with the bypass flow discharge port at least when the flow prioritizing control valve element is in the one or more second positions.

8. The system of claim 6, wherein:
the one or more first positions includes a plurality of first positions;

the pump capacity control pressure inlet port is in fluid communication with the bypass flow discharge port when the flow prioritizing control valve element is in a first subset of the plurality of first positions; and
the pump capacity control pressure inlet port is not in fluid communication with the bypass flow discharge port when the flow prioritizing control valve element is in a second subset of the plurality of first positions.

9. The system of claim 6, wherein:
the flow prioritizing control valve body includes an inner surface that defines a main chamber;
the flow prioritizing control valve element is movably disposed in the main chamber and divides the main chamber into a first sub-chamber and a second sub-chamber;
the first sub-chamber is continuously in fluid communication with the pump capacity control pressure inlet port and, depending on flow prioritizing control valve element position, selectively in fluid communication with the prioritizing control pressure outlet port and the bypass flow discharge port; and
the second sub-chamber is continuously in fluid communication with the flow prioritizing control valve reference pressure port.

10. The system of claim 9, further comprising:
a spring disposed within the second sub-chamber between the flow prioritizing control valve body inner surface and the flow prioritizing control valve element, the spring supplying a bias force to the flow prioritizing control valve element that urges the flow prioritizing control valve element toward the one or more first positions.

11. The system of claim 5, wherein:
the pump includes a pump inlet and a pump outlet; and
the flow prioritizing control valve bypass flow discharge port is in fluid communication with the pump inlet.

12. The system of claim 1, wherein:
the pump is a centrifugal pump;
the pump capacity control pressure inlet port is in fluid communication with the prioritizing control pressure outlet port when the flow prioritizing control valve is supplying fluid to the regulating valve control pressure inlet port;
the flow prioritizing control valve further includes a priority flow inlet port and a priority flow outlet port, the priority flow inlet port in fluid communication with the pump to receive a second portion of the fluid supplied therefrom; and
the flow prioritizing control valve is further responsive to the fluid pressure at the pump capacity fluid pressure inlet port to throttle the second portion of the fluid discharged out the priority flow outlet port.

13. The system of claim 12, wherein the flow prioritizing control valve comprises:
a flow prioritizing control valve body including the pump capacity control pressure inlet port, the prioritizing control pressure outlet port, the priority flow inlet port, the priority flow outlet port, and a flow prioritizing control valve reference pressure port, the pump capacity control pressure inlet port in fluid communication with the pump to receive the second portion of the fluid supplied therefrom; and
a flow prioritizing control valve element disposed in the flow prioritizing control valve body and responsive, at least in part, to a difference in fluid pressure at the pump capacity control pressure inlet port and the flow prioritizing control valve reference pressure port to move between one or more first positions, in which the pump capacity control pressure inlet port is in fluid communication with the prioritizing control pressure outlet port, and one or more second positions in which the pump capacity control pressure inlet port is not in fluid communication with the prioritizing control pressure outlet port.

14. The system of claim 13, wherein:
the flow prioritizing control valve element is in the one or more first positions when the pump discharge pressure is at or below a first pressure; and
the flow prioritizing control valve element is in the one or more second positions when the pump discharge pressure is above the first discharge pressure.

15. The system of claim 13, wherein:
the flow prioritizing control valve body includes an inner surface that defines a main chamber;
the flow prioritizing control valve element is movably disposed in the main chamber and includes a flow prioritizing control valve element first and second spools, the first and second spools coupled together and spaced apart from one another and dividing the main chamber into a first sub-chamber, a second sub-chamber, and a third sub-chamber;
the first sub-chamber is continuously in fluid communication with the pump capacity control pressure inlet port and, depending on the flow prioritizing control valve element position, is selectively in fluid communication with the prioritizing control pressure outlet port;
the second sub-chamber is continuously in fluid communication with the priority flow outlet port and, depending on the position of the flow prioritizing control valve element, is at least selectively in fluid communication with the priority flow inlet port; and
the third sub-chamber is continuously in fluid communication with the flow prioritizing control valve reference pressure port.

16. The system of claim 15, further comprising:
a spring disposed within the third sub-chamber between the flow prioritizing control valve body inner surface and the flow prioritizing control valve element second spool, the spring supplying a bias force to the flow prioritizing control valve element that urges the flow prioritizing control valve element toward the one or more first positions.

17. The system of claim 1, wherein:
the pump is a variable displacement piston pump including an adjustable swash plate that is movable to a plurality of positions, the variable displacement piston pump configured, upon being driven, to supply the fluid at a pump discharge pressure that is dependent on the drive speed and the position of the adjustable swash plate;
the pump capacity control pressure inlet port is in fluid communication with the prioritizing control pressure outlet port when the flow prioritizing control valve is supplying fluid to the regulating valve control pressure inlet port;
the flow prioritizing control valve further includes a pump control pressure port, the pump control pressure port adapted to receive fluid at a pump control pressure;
the flow prioritizing control valve is coupled to the adjustable swash plate; and
the flow prioritizing control valve is further responsive to the fluid pressure at the pump capacity fluid pressure inlet port to move the adjustable swash plate to a control position.

18. The system of claim 17, wherein the flow prioritizing control valve comprises:

a flow prioritizing control valve body including the pump capacity control pressure inlet port, the prioritizing control pressure outlet port, and the pump control pressure port; and a flow prioritizing control valve element disposed in the flow prioritizing control valve body and coupled to the adjustable swash plate, the flow prioritizing control valve element responsive to a difference in fluid pressure at the pump capacity control pressure inlet port and the pump control pressure port to move between one or more first positions, in which the pump capacity control pressure inlet port is in fluid communication with the prioritizing control pressure outlet port, and one or more second positions in which the pump capacity control pressure inlet port is not in fluid communication with the prioritizing control pressure outlet port.

19. The system of claim 18, wherein:

the pump capacity control pressure inlet port is adapted to be coupled to a first control pressure source;

the pump control pressure port is adapted to be coupled to a second control pressure source;

the flow prioritizing control valve element is in the one or more first positions when the difference in fluid pressure is at or below a first pressure; and the flow prioritizing control valve element is in the one or more second positions when the difference in fluid pressure is above the first discharge pressure.

20. The system of claim 18, wherein:

the flow prioritizing control valve body includes an inner surface that defines a chamber;

the flow prioritizing control valve element is movably disposed in the main chamber and divides the main chamber into a first sub-chamber and a second sub-chamber;

the first sub-chamber is in fluid communication with the pump capacity control pressure inlet port and, depending on the flow prioritizing control valve element position, is selectively in fluid communication with the prioritizing control pressure outlet port;

the second sub-chamber is in fluid communication with the pump control port.

* * * * *

UNITED STATES PATENT AND TRADEMARK OFFICE
CERTIFICATE OF CORRECTION

PATENT NO. : 7,841,841 B2  
APPLICATION NO. : 11/844199  
DATED : November 30, 2010  
INVENTOR(S) : Arnett et al.

It is certified that error appears in the above-identified patent and that said Letters Patent is hereby corrected as shown below:

Column 4, line 15, "fuel does not does not flow" should be changed to --fuel does not flow--

Signed and Sealed this
Tenth Day of May, 2011

David J. Kappos
*Director of the United States Patent and Trademark Office*